US011337142B2

(12) United States Patent
Takahashi et al.

(10) Patent No.: US 11,337,142 B2
(45) Date of Patent: May 17, 2022

(54) BASE STATION, USER EQUIPMENT AND BROADCAST INFORMATION TRANSMISSION AND RECEPTION METHOD

(71) Applicant: NTT DOCOMO, INC., Tokyo (JP)

(72) Inventors: Hideaki Takahashi, Tokyo (JP); Kazuaki Takeda, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/573,759

(22) PCT Filed: May 12, 2016

(86) PCT No.: PCT/JP2016/064192
§ 371 (c)(1),
(2) Date: Nov. 13, 2017

(87) PCT Pub. No.: WO2016/186007
PCT Pub. Date: Nov. 24, 2016

(65) Prior Publication Data
US 2018/0132165 A1    May 10, 2018

(30) Foreign Application Priority Data

May 15, 2015  (JP) .............................. JP2015-100565

(51) Int. Cl.
*H04W 48/10*  (2009.01)
*H04W 48/16*  (2009.01)
(Continued)

(52) U.S. Cl.
CPC .............. *H04W 48/10* (2013.01); *H04L 1/18* (2013.01); *H04W 48/16* (2013.01); *H04W 72/04* (2013.01);
(Continued)

(58) Field of Classification Search
CPC ..... H04W 92/20; H04W 92/22; H04W 48/10; H04W 48/16; H04W 72/04; H04W 72/12; H04W 72/0446; H04L 1/18
See application file for complete search history.

(56) References Cited

U.S. PATENT DOCUMENTS

2007/0260851 A1* 11/2007 Taha ................. H04W 52/0229
712/204
2008/0267309 A1  10/2008 Saini et al.
(Continued)

FOREIGN PATENT DOCUMENTS

WO   2009/128438 A1   10/2009
WO   2014179874 A1   11/2014
(Continued)

OTHER PUBLICATIONS

Written Opinion of the International Searching Authority issued PCT/JP2016/064192 dated Jun. 21, 2016. (Year: 2016).*
(Continued)

*Primary Examiner* — Michael K Phillips
(74) *Attorney, Agent, or Firm* — Osha Bergman Watanabe & Burton LLP

(57) ABSTRACT

Techniques for receiving repeatedly transmitted broadcast information appropriately are disclosed. One aspect of the present invention relates to a base station including a communication control unit configured to control radio communication with user equipment and a broadcast information transmission unit configured to transmit broadcast information, wherein the broadcast information transmission unit includes scheduling information for second system information in first system information and broadcasts the second system information in accordance with the scheduling information.

4 Claims, 7 Drawing Sheets

```
SchedulingInfoList ::= SEQUENCE (SIZE (1..maxSI-Message)) OF SchedulingInfo

SchedulingInfo ::=    SEQUENCE {
    si-Periodicity                ENUMERATED {
                                      rf8, rf16, rf32, rf64, rf128, rf256, rf512},
    sib-MappingInfo               SIB-MappingInfo,
    si-WindowLength               ENUMERATED {ms1, ms2, ...},
    si-RepetitionInterval         ENUMERATED {n1, n2, n3, ...},
    si-RepetitionOffset           ENUMERATED {n1, n2, n3, ...}
}

SIB-MappingInfo ::= SEQUENCE (SIZE (0..maxSIB-1)) OF SIB-Type

SIB-Type ::=                  ENUMERATED {
                                  sibType3, sibType4, sibType5, sibType6,
                                  sibType7, sibType8, sibType9, sibType10,
                                  sibType11, sibType12-v920, sibType13-v920,
                                  sibType14-v1130, sibType15-v1130,
                                  sibType16-v1130, sibType17-v1250,
sibType18-v1250,
                                  ..., sibType19-v1250}
```

(51) Int. Cl.
  *H04W 72/12*    (2009.01)
  *H04W 72/04*    (2009.01)
  *H04L 1/18*     (2006.01)
(52) U.S. Cl.
  CPC ........ *H04W 72/12* (2013.01); *H04W 72/0446* (2013.01)

(56) References Cited

U.S. PATENT DOCUMENTS

| | | | | |
|---|---|---|---|---|
| 2014/0192775 | A1* | 7/2014 | Li | H04W 36/0072 370/331 |
| 2014/0334372 | A1* | 11/2014 | Vos | H04W 48/10 370/312 |
| 2015/0181575 | A1* | 6/2015 | Ng | H04W 72/042 370/329 |
| 2015/0264511 | A1* | 9/2015 | Rashid | H04W 4/70 370/329 |
| 2016/0330698 | A1* | 11/2016 | Loehr | H04W 4/70 |
| 2017/0105166 | A1* | 4/2017 | Lee | H04W 68/005 |
| 2017/0171797 | A1* | 6/2017 | Nigam | H04W 68/005 |
| 2017/0318478 | A1* | 11/2017 | Basu Mallick | H04L 5/0069 |
| 2018/0020438 | A1* | 1/2018 | Martin | H04W 4/70 |
| 2018/0054743 | A1* | 2/2018 | Lee | H04L 5/00 |

FOREIGN PATENT DOCUMENTS

| | | | | | |
|---|---|---|---|---|---|
| WO | WO-2015018345 | A1 * | 2/2015 | | H04W 48/12 |
| WO | 2015042892 | A1 | 4/2015 | | |
| WO | 2015046853 | A1 | 4/2015 | | |
| WO | WO-2015046853 | A1 * | 4/2015 | | H04W 72/042 |
| WO | 2015066645 | A1 | 5/2015 | | |

OTHER PUBLICATIONS

Zhao et al., "System information transmission method, reception method, and device", Feb. 12, 2015, WIPO, WO 2015/018345, English machine language translation. (Year: 2015).*
Ericsson, "Transport of System information over Iub", Sep. 20-24, 1999, 3GPP, TSGW3#7(99)B63 (Year: 1999).*
International Search Report of the International Searching Authority issued in PCT/JP2016/064192 dated Jun. 21, 2016 (5 pages).
Written Opinion of the International Searching Authority issued in PCT/JP2016/064192 dated Jun. 21, 2016 (5 pages).
3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).
Ericsson; "Further LTE Physical Layer Enhancements for MTC"; 3GPP TSG RAN Meeting #67, RP-150492; Shanghai, China; Mar. 9-12, 2015 (8 pages).
3GPP TS 36.331 V12.5.0; "3rd Generation Partnership Project; Technical Specification Group Radio Access Network; Evolved Universal Terrestrial Radio Access (E-UTRA); Radio Resource Control (RRC); Protocol specification (Release 12)"; Mar. 2015 (445 pages).
3GPP TS 36.300 V12.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Mar. 2015 (251 pages).
NTT DOCOMO; "Views on SIB design in Rel-13 Low Cost MTC"; 3GPP TSG RAN WG1 Meeting #80, R1-150535; Athens, Greece; Feb. 9-13, 2015 (4 pages).
Japanese Office Action for corresponding Japanese Application No. 2015-100565 dated Jun. 21, 2016 (7 pages).
Japanese Office Action for corresponding Japanese Application No. 2015-100565 dated Nov. 1, 2016 (6 pages).
Ericsson; "Further LTE Physical Layer Enhancements for MTC"; 3GPP TSG RAN meeting #67, RP-150100; Shanghai, China; Mar. 9-12, 2015 (14 pages).
Japanese Office Action for corresponding Japanese Application No. 2015-100565 dated May 16, 2017 (5 pages).
Office Action issued in counterpart European Patent Application No. 16796400.6, dated Nov. 11, 2018 (9 Pages).
Extended European Search Report issued in corresponding European Application No. 16796400.6, dated Mar. 21, 2018 (9 pages).
Summons to attend oral proceedings pursuant to Rule 115(1) EPC Issued in European Application No. 16796400.6, dated Jan. 21, 2020 (9 pages).
Office Action issued in Chinese Application No. 201680027342.X; dated May 7, 2020 (20 pages).
Office Action issued in Chinese Application No. 201680027342.X; dated Feb. 2, 2021 (17 pages).

* cited by examiner

FIG.4

```
SchedulingInfoList ::= SEQUENCE (SIZE (1..maxSI-Message)) OF SchedulingInfo

SchedulingInfo ::=    SEQUENCE {
    si-Periodicity        ENUMERATED {
                              rf8, rf16, rf32, rf64, rf128, rf256, rf512},
    sib-MappingInfo       SIB-MappingInfo,
    si-WindowLength       ENUMERATED {ms1, ms2, ...},
    si-RepetitionInterval ENUMERATED {n1, n2, n3, ...},
    si-RepetitionOffset   ENUMERATED {n1, n2, n3, ...}
}

SIB-MappingInfo ::= SEQUENCE (SIZE (0..maxSIB-1)) OF SIB-Type

SIB-Type ::=          ENUMERATED {
                          sibType3,  sibType4,  sibType5,  sibType6,
                          sibType7,  sibType8,  sibType9,  sibType10,
                          sibType11, sibType12-v920, sibType13-v920,
                          sibType14-v1130, sibType15-v1130,
                          sibType16-v1130, sibType17-v1250,
                          sibType18-v1250,
                          ..., sibType19-v1250}
```

BASE STATION, USER EQUIPMENT AND BROADCAST INFORMATION TRANSMISSION AND RECEPTION METHOD

The present application is a U.S. National Stage Application of PCT Application No. PCT/JP2016/064192 filed on May 12, 2016, which claims priority to Japanese Patent Application No. 2015-100565 filed on May 15, 2015, the entire contents of which are hereby incorporated by reference.

TECHNICAL FIELD

The present invention relates to a radio communication system.

BACKGROUND ART

In presently designed Release 13 (Rel-13) of LTE (Long Term Evolution), various functions required to be provided in a MTC (Machine Type Communication) type of user equipment (UE) are being considered. As one example, user equipment (Low Cost User Equipment: LC UE) having the transmission and reception bandwidth limited to 1.4 MHz for cost reduction is considered. As another example, since there is a likelihood that the MTC terminals may be located in areas, such as depth areas in buildings and/or underground areas, where building penetration loss is large and radio communication is difficult, user equipment designed for enhanced coverage (Enhanced Coverage User Equipment: EC UE) is considered.

In the LTE system, broadcast information regarding cells such as a master information block (MIB) and a system information block (SIB) is periodically transmitted. In the existing LTE system, the MIB is assumed to be transmitted in the cycle of 40 ms, and the user equipment can soft combine the MIB repeatedly transmitted up to four times in the cycle. Also, the SIB 1 is defined to be transmitted in the cycle of 80 ms, and the user equipment can soft combine the SIB 1 repeatedly transmitted up to four times in the cycle. Further, SIBx (SIB 2, SIB 3, . . . ) other than the SIB 1 are stored and transmitted in system information (SI message) in accordance with mapping indicated in schedulingInfo in the SIB 1. For example, as illustrated in FIG. 1, the SIB 2 may be stored in SI-1 and transmitted in the cycle of 160 ms. The SIBs 3 and 6 may be stored in SI-2 and transmitted in the cycle of 320 ms. The SIB 5/10 may be stored in SI-3 and transmitted in the cycle of 320 ms. The SIB 10/11 may be stored in SI-4 and transmitted in the cycle of 320 ms. The SIB 11 may be stored in SI-5 and transmitted in the cycle of 320 ms. (Here, if the SIB 11 is stored in the SI-4, the SI-5 is not configured.) In other words, the SI-1 to SI-5 are transmitted within the SI cycle of 320 ms.

Here, the SI messages can be transmitted at arbitrary number of times in an SI window, and the user equipment can soft combine the SI received in the SI window. In the illustrated example, the period of the SI window is set to 20 ms. The period or size of the SI window is common over the respective SI messages, and the SI windows do not overlap with each other. The SIB having the same cycle can be multiplexed into the same SI messages.

PRIOR ART TECHNICAL DOCUMENT

Non-Patent Document

Non-patent document 1: 3GPP TR 36.888, "Study on provision of low-cost Machine-Type Communications (MTC) User Equipments (UEs) based on LTE"

Non-patent document 2: 3GPP RP-150492, "Further LTE Physical Layer Enhancements for MTC", Rel-13 Work Item Description

SUMMARY OF INVENTION

Problem to be Solved by the Invention

The existing LTE terminal can receive a PDCCH (Physical Downlink Control Channel) and determine whether broadcast information is transmitted based on the received PDCCH. As a result, even if the SI messages have been transmitted at an arbitrary number of times within the SI window, the LTE terminal can receive the SI messages.

Meanwhile, since a LC UE receives the SI messages within the SI window without receiving the PDCCH, according to an existing broadcast information reception manner, where it is presumed that the PDCCH is received, the LC UE cannot identify the SI messages repeatedly transmitted within the SI window.

In light of the above-stated problem, an object of the present invention is to provide techniques for receiving the repeatedly transmitted broadcast information appropriately.

Means for Solving the Problem

In order to achieve the above object, one aspect of the present invention relates to a base station, comprising: a communication control unit configured to control radio communication with user equipment; and a broadcast information transmission unit configured to transmit broadcast information, wherein the broadcast information transmission unit includes scheduling information for second system information in first system information and broadcasts the second system information in accordance with the scheduling information.

Another aspect of the present invention relates to user equipment, comprising: a transmission and reception unit configured to transmit and receive radio signals to and from a base station; and a broadcast information reception unit configured to receive broadcast information from the base station, wherein the broadcast information reception unit receives second system information in accordance with scheduling information for the second system information included in first system information received from the base station.

A still further aspect of the present invention relates to a broadcast information transmission and reception method, comprising: broadcasting, by a base station, first system information and second system information, wherein the first system information includes scheduling information for the second system information; and receiving, by user equipment, the first system information and the second system information, wherein the second system information is received in accordance with the scheduling information in the first system information.

Advantage of the Invention

According to the present invention, techniques for receiving the repeatedly transmitted broadcast information appropriately can be provided.

BRIEF DESCRIPTION OF DRAWINGS

FIG. 4 is a diagram for illustrating exemplary signaling according to one embodiment of the present invention;

EMBODIMENTS OF THE INVENTION

Embodiments of the present invention are described below with reference to the drawings.

In embodiments below, user equipment for receiving and combining broadcast information repeatedly transmitted from a base station is disclosed. In the outline of embodiments as stated below, when the base station transmits the broadcast information, the base station transmits various types of broadcast information by including scheduling information on transmission opportunities for certain types of broadcast information in other types of broadcast information. The user equipment receives the certain types of broadcast information in accordance with the scheduling information. For example, in an LTE system, when the base station broadcasts system information (SIBx) on a cell, the base station transmits SIB1 including the scheduling information on transmission opportunities of subsequent SIBx (SIB2, SIB3, . . . ). Upon receiving the SIB1, the user equipment can receive and combine the subsequent SIBx in accordance with the scheduling information in the received SIB1. As a result, the user equipment can receive the broadcast information appropriately without receiving the PDCCH, and the present embodiment enables low-cost user equipment, for which it is not assumed that the PDCCH is received, to receive the broadcast information appropriately.

Figure 1:
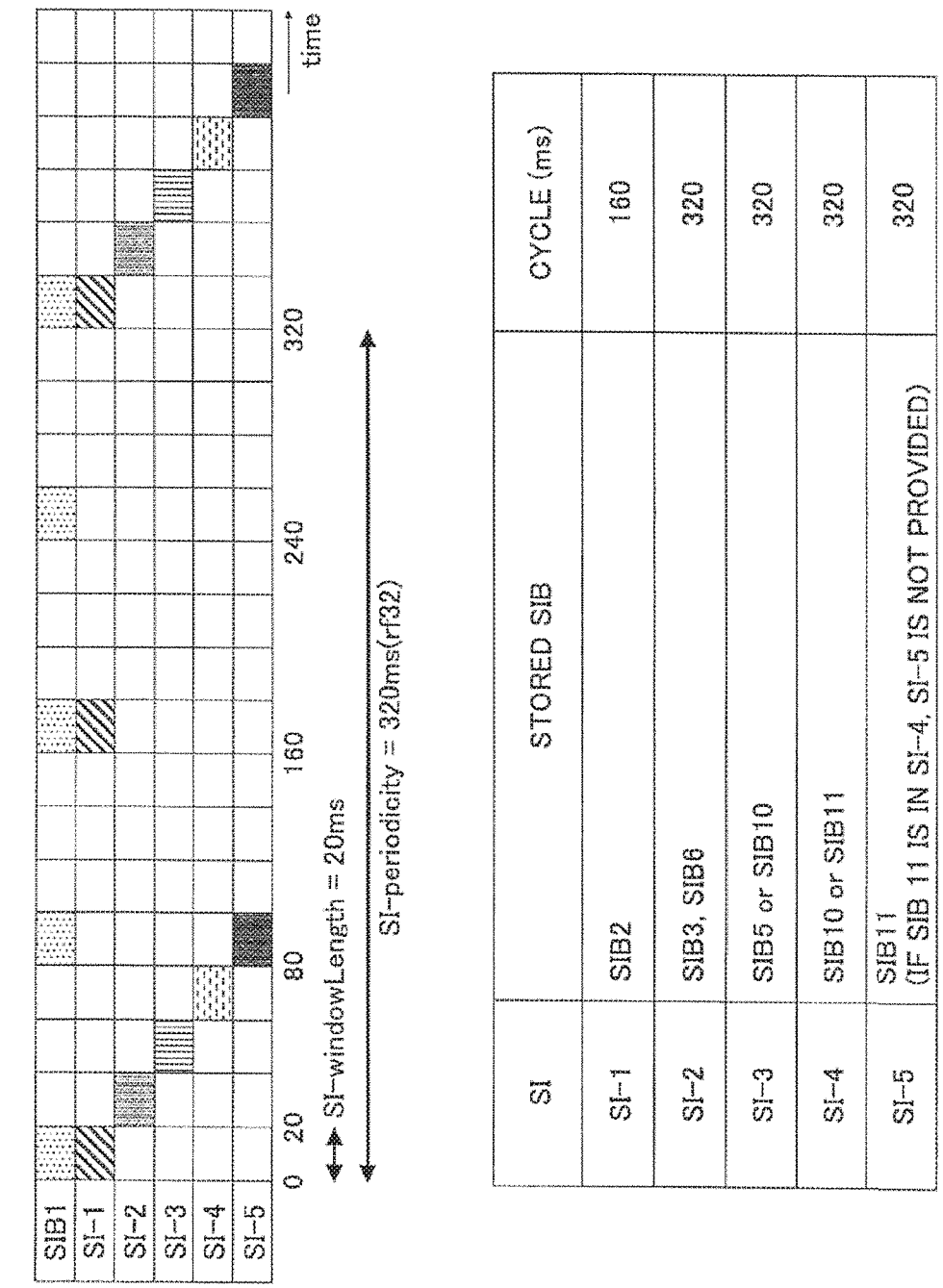
FIG. 1 is a diagram for illustrating exemplary transmission cycles of conventional system information.
Figure 2A:
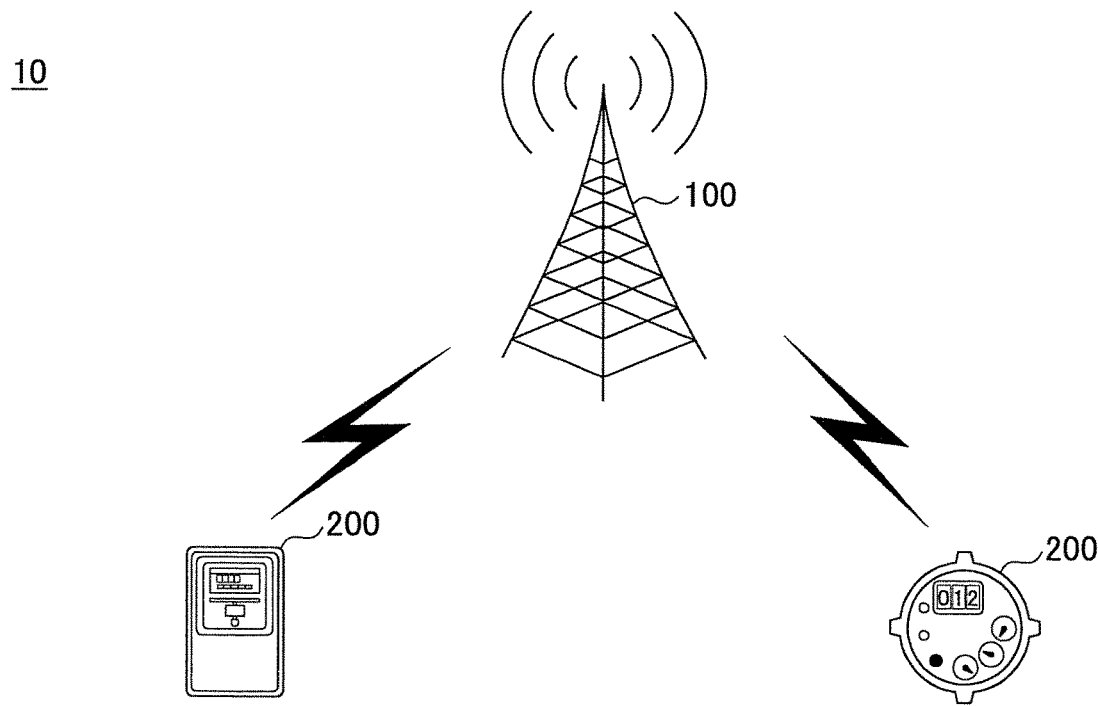
FIG. 2A is a schematic diagram for illustrating a radio communication system according to one embodiment of the present invention.
Figure 2B:
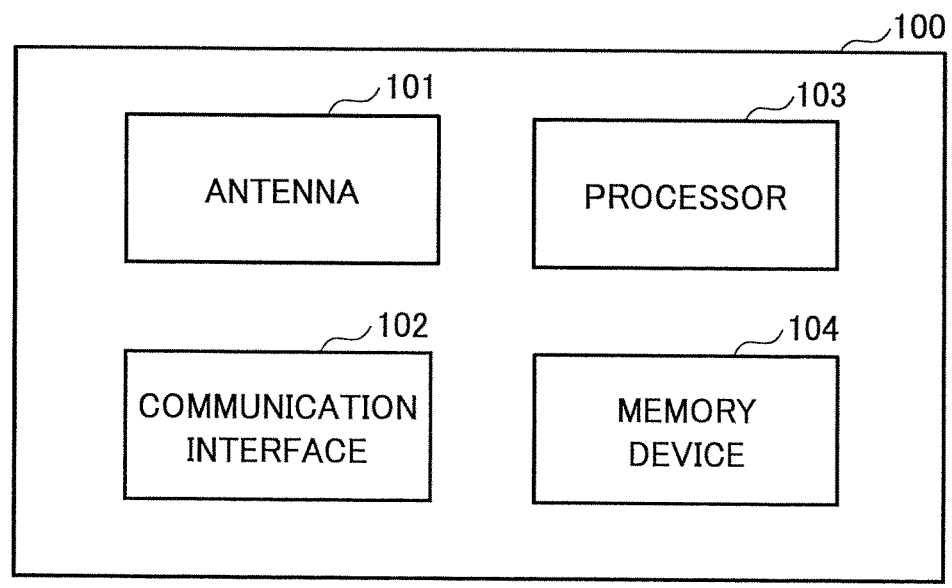
FIG. 2B is a block diagram for illustrating a hardware arrangement of a base station according to one embodiment of the present invention.

A radio communication system according to one embodiment of the present invention is described with reference to FIG. 2A. FIG. 2A is a schematic diagram for illustrating a radio communication system according to one embodiment of the present invention.

As illustrated in FIG. 2A, the radio communication system 10 has a base station 100 and user equipment 200. For example, the radio communication system 10 may be an LTE system or an LTE-Advanced system. In the illustrated embodiment, only the single base station 100 is illustrated, but a large number of base stations 100 are disposed to cover a service area of the radio communication system 10.

The base station 100 wirelessly connects to the user equipment 200 to transmit downlink (DL) packets received from an upper station and/or server communicatively connected to a core network (not shown) to the user equipment 200 and uplink (UL) packets received from the user equipment 200 to the server. Also, the base station 100 periodically transmits the broadcast information on cells such as a master information block (MIB) and a system information block (SIBx) as described in detail below.

As illustrated in 2B, the base station 100 is typically arranged with hardware resources such as an antenna 101 for transmitting and receiving radio signals to/from the user equipment 200, a communication interface 102 including a communication interface (X2 interface or the like) for communicating with adjacent base stations and a communication interface (S1 interface or the like) for communicating with a core network, a processor 103 for processing signals transmitted and received to/from the user equipment 200 and a memory device 104. Functions and operations of the base station 100 as stated below may be implemented by the processor 103 processing or executing data and/or programs stored in the memory device 104. However, the base station 100 is not limited to the above-stated hardware arrangement and may have any other appropriate hardware arrangement.

The user equipment 200 transmits and receives radio signals to/from the base station 100 via a cell served by the base station 100. As illustrated, the user equipment 200 is implemented as an MTC terminal installed in a power meter, a water meter or a gas meter, for example, and may be, but is not limited to, any appropriate information processing device having radio communication functionalities such as a smartphone, a cellular phone, a tablet, a mobile router and a wearable terminal. Also, the user equipment 200 may be of a normal type supporting the system bandwidth (20 MHz or the like in the LTE system) or of a low-cost (LC) type supporting only a limited frequency bandwidth (1.4 MHz or the like, for example). Furthermore, the user equipment 200 may be of an enhanced coverage (EC) type having a coverage enhancement function.

Figure 2C:
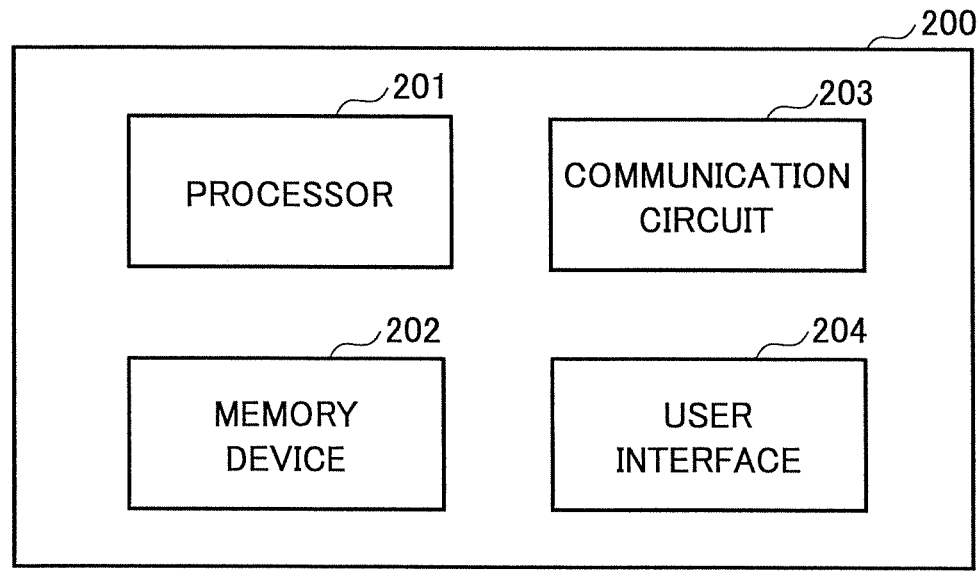
FIG. 2C is a block diagram for illustrating a hardware arrangement of user equipment according to one embodiment of the present invention.

As illustrated in FIG. 2C, the user equipment 200 is arranged with a processor 201, a memory device 202 such as a RAM (Random Access Memory) or a flash memory, a communication circuit 203 for transmitting and receiving radio signals to/from the base station 100, a user interface 204 such as an input and output device, and so on. For example, functions and operations of the user equipment 200 as stated below may be implemented by the processor 201 processing or executing data and/or programs stored in the memory device 202. However, the user equipment 200 is not limited to the above-stated hardware arrangement and may be formed of circuits for implementing one or more of operations as stated below.

Figure 3:
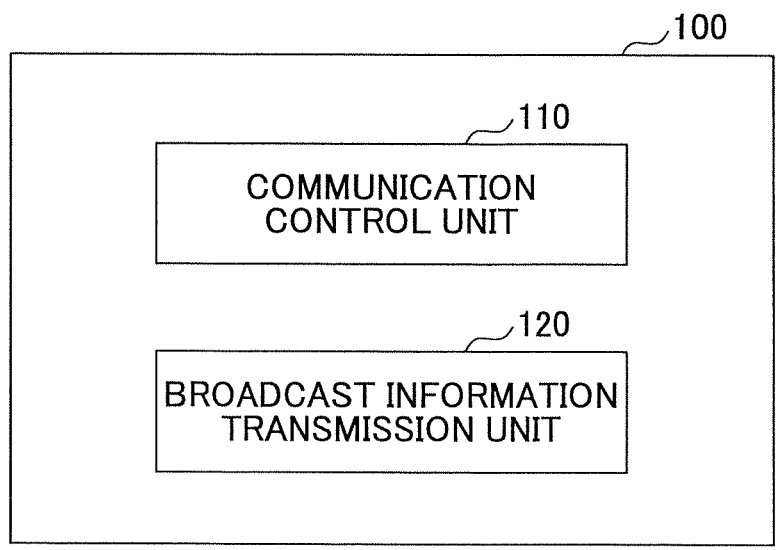
FIG. 3 is a block diagram for illustrating an arrangement of the base station according to one embodiment of the present invention.

Next, the base station according to one embodiment of the present invention is described with reference to FIGS. 3-6. FIG. 3 is a block diagram for illustrating an arrangement of the base station according to one embodiment of the present invention.

As illustrated in FIG. 3, the base station 100 has a communication control unit 110 and a broadcast information transmission unit 120.

The communication control unit 110 controls radio communication with the user equipment 200. Specifically, the communication control unit 110 transmits and receives various control signals and data signals to and from the user equipment 200 connecting to one or more cells.

The broadcast information transmission unit 120 transmits broadcast information. Also, the broadcast information transmission unit 120 includes scheduling information for second system information in first system information and broadcasts the second system information in accordance with the scheduling information. In other words, the broadcast information transmission unit 120 periodically broadcasts cell information on individual cells served by the base station 100 in master information blocks (MIB) and system information blocks (SIB1, SIB2, . . . ). Specifically, the broadcast information transmission unit 120 repeatedly transmits the MIB at a predetermined cycle such as 40 ms and includes the scheduling information indicative of transmission opportunities of the SIB1 in the MIB. Furthermore, the broadcast information transmission unit 120 repeatedly transmits the SIB1 in accordance with the scheduling information and includes the scheduling information indicative of transmission opportunities of subsequent SIBx (SIB2, SIB3, . . . ) in the SIB1. Here, the SIBx (SIB2, SIB3, . . . ) other than the SIB1 is stored and transmitted in system information (SI) messages (SI message) in accordance with mapping indicated in the scheduling information for the SIB1.

In one embodiment, the scheduling information may identify subframes for repeatedly transmitting the second system information. For example, the broadcast information transmission unit 120 may include scheduling information indicative of subframes for transmitting the subsequent SIBx (SIB2, SIB3, . . . ) in the SIB1. The user equipment 200 can identify the subframes for transmitting the subsequent SIBx based on the scheduling information and receive the subsequent SIBx in the identified subframes. Specifically, the user equipment 200 can receive the SIBx stored in respective SI messages in the identified subframes in accordance with the mapping indicated in the scheduling information.

Here, the repeatedly transmitted subframes may be identified with a window length, a repetition cycle and a transmission start timing for transmission of the second system information. In other words, the scheduling information may include the window length, the repetition cycle and the transmission start timing for transmitting the second system information. As stated above, the SIBx (SIB2, SIB3, . . . ) are stored and transmitted in the SI messages, and the respective SI messages are repeatedly transmitted within a system information (SI) window. For example, the broadcast information transmission unit 120 may broadcast the SIB1 including the scheduling information (SchedulingInfo) having a signaling data structure as illustrated in FIG. 4. As illustrated, the scheduling information (SchedulingInfo) may have a window length (si-WindowLength) of the SI window, a cycle (si-RepetitionInterval) of repeated transmission of the SI messages within the SI window and a start subframe (si-RepetitionOffset) of transmission of the SI messages. Conventionally, the SI window is configured in common to all the SI messages. According to the present embodiment, however, different window lengths can be configured for the respective SI messages, and the user equipment 200 can identify transmission timings of the SI messages repeatedly transmitted within the SI window based on the scheduling information.

Specifically, the SI messages are transmitted in subframes X to satisfy $$\text{si-RepetitionOffset} = X \bmod (\text{si-RepetitionInterval}),$$

where $0 \leq X \leq \text{si-WindowLength} - 1$.

Figure 5:
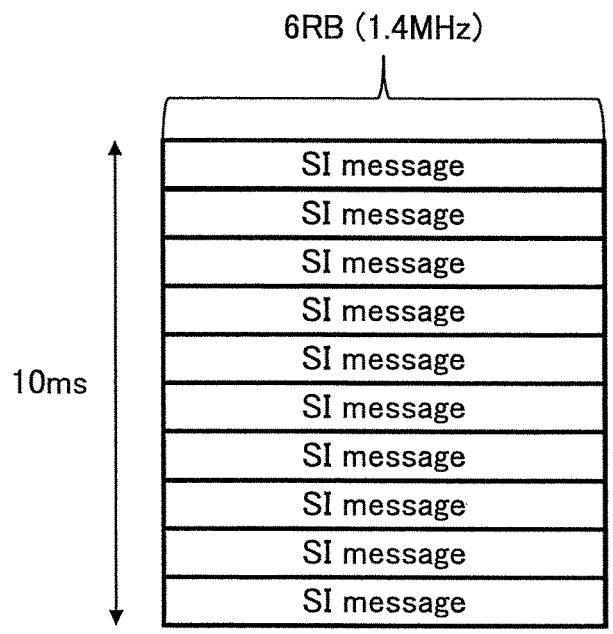
FIG. 5 is a schematic diagram for illustrating an exemplary transmission pattern of SI messages.

For example, if si-WindowLength=10 ms, si-RepetitionInterval=1 and si-RepetitionOffset=0 are configured in the scheduling information, the SI messages are transmitted in all subframes within the SI window as illustrated in FIG. 5. In the case where the base station 100 can transmit the broadcast information for normal type of user equipment 200 supporting a system bandwidth (20 MHz or the like) and the limited bandwidth broadcast information for LC type of user equipment 200 supporting only a limited frequency bandwidth (1.4 MHz or the like), for example, the broadcast information transmission unit 120 may transmit the SI messages having six resource blocks (RB) in size, as considered for the transmission and reception bandwidth of 1.4 MHz for the limited bandwidth broadcast information, as illustrated.

Figure 6:
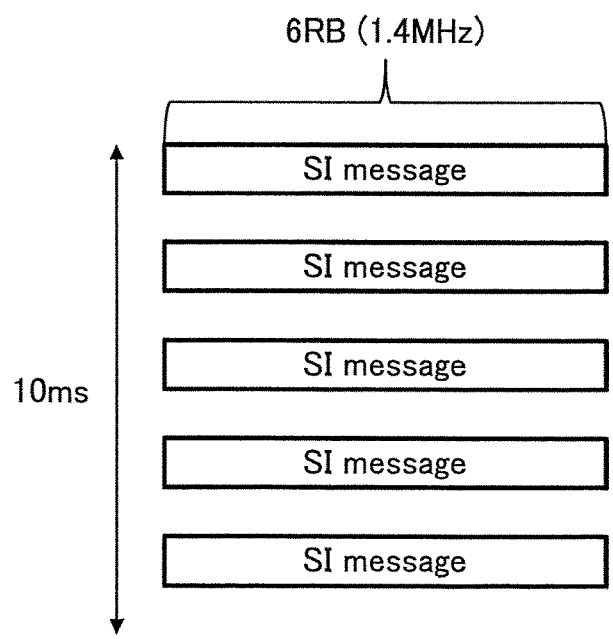
FIG. 6 is a schematic diagram for illustrating an exemplary transmission pattern of SI messages.

Also, if si-WindowLength=10 ms, si-RepetitionInterval=2 and si-RepetitionOffset=0 are configured in the scheduling information, the SI messages are alternately transmitted five times from the first subframe in the SI window, as illustrated in FIG. 6.

Figure 7:
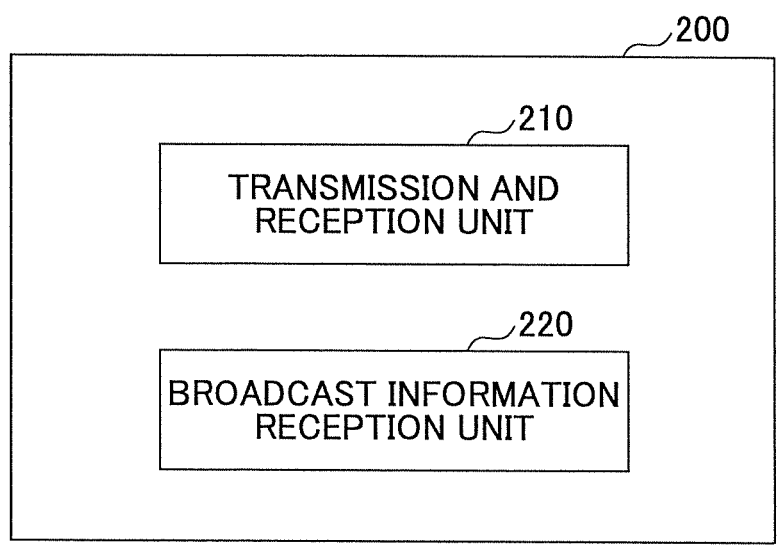
FIG. 7 is a block diagram for illustrating an arrangement of the user equipment according to one embodiment of the present invention.

Next, the user equipment according to one embodiment of the present invention is described with reference to FIG. 7. FIG. 7 is a block diagram for illustrating an arrangement of the user equipment according to one embodiment of the present invention.

As illustrated in FIG. 7, the user equipment 200 has a transmission and reception unit 210 and a broadcast information reception unit 220.

The transmission and reception unit 210 transmits and receives radio signals to and from the base station 100. Specifically, in downlink communication, the transmission and reception unit 210 receives various downlink channels such as a PDCCH (Physical Downlink Control Channel) and/or a PDSCH (Physical Downlink Shared Channel) from the base station 100. On the other hand, in uplink communication, the transmission and reception unit 210 transmits various uplink channels such as a PUCCH (Physical Uplink Control Channel) and/or a PUSCH (Physical Uplink Shared Channel) to the base station 100.

The broadcast information reception unit 220 receives broadcast information from the base station 100 and receives second system information in accordance with scheduling information for the second system information included in first system information received from the base station 100. Specifically, the broadcast information reception unit 220 receives cell information on a visited cell through the MIB and the SIBx (SIB1, SIB2, . . . ). In LTE standard, the broadcast information reception unit 220 receives the MIB repeatedly transmitted at a predetermined cycle such as 40 ms and receives the SIB1 in accordance with the scheduling information indicative of transmission opportunities of the SIB1 in the MIB. Furthermore, the broadcast information reception unit 220 receives the SIB1 repeatedly transmitted in accordance with the scheduling information and receives the SIBx repeatedly transmitted in accordance with the scheduling information in the SIB 1 for indicating transmission opportunities of the subsequent SIBx (SIB2, SIB3, . . . ). At this time, the SIBx (SIB2, SIB3, . . . ) other than the SIB1 is stored and transmitted in system information (SI) messages (SI messages) in accordance with mapping indicated in the scheduling information for the SIB1, and the broadcast information reception unit 220 receives the respective SI messages stored in the mapped SIBx.

In one embodiment, the scheduling information may identify subframes for repeatedly transmitting the second system information. For example, upon receiving the SIB1, the broadcast information reception unit 220 can retrieve scheduling information indicative of the subframes for repeatedly transmitting the subsequent SIBx (SIB2, SIB3, . . . ) and receive the SIBx in the subframes for transmitting the subsequent SIBx based on the retrieved scheduling information.

Here, the repeatedly transmitted subframes may be identified with a window length, a repetition cycle and a transmission start timing for transmission of the second system information. In other words, the scheduling information may include the window length, the repetition cycle and the transmission start timing for transmitting the second system information. As stated above, the SIBx (SIB2, SIB3, . . . ) are stored and transmitted in the SI messages, and the respective SI messages are repeatedly transmitted within a system information (SI) window. For example, upon receiving the SIB1 having a signaling data structure as illustrated in FIG. 4, the broadcast information reception unit 220 may retrieve the scheduling information (SchedulingInfo) from the received SIB1 and identify a window length (si-Window-Length) of the SI window, a cycle (si-RepetitionInterval) of repeated transmission of the SI messages within the SI window and a start subframe (si-RepetitionOffset) of transmission of the SI messages from the retrieved scheduling information.

Conventionally, the SI window is configured in common to all the SI messages. According to the present embodiment, however, different window lengths can be configured for the respective SI messages. The broadcast information reception unit 220 can identify transmission timings of the SI messages repeatedly transmitted within the SI window based on the scheduling information.

Specifically, the SI messages are transmitted in subframes X to satisfy $$\text{si-RepetitionOffset}=X \bmod(\text{si-RepetitionInterval}),$$

where $0 \leq X \leq \text{si-WindowLength}-1$.

In one embodiment, the broadcast information reception unit 220 may soft-combine the second system information repeatedly received within a window for transmitting the second system information. In other words, the broadcast information reception unit 220 may receive and combine the SIBx repeatedly transmitted in accordance with the scheduling information within the respective SI windows. For example, in the example as illustrated in FIG. 5, the broadcast information reception unit 220 may restore the SIBx mapped in the SI messages by soft-combining ten received SI messages to receive the ten SI messages within the SI window having the window length of 10 ms. Also, in the example as illustrated in FIG. 6, the broadcast information reception unit 220 may restore the SIBx mapped in the SI messages by soft-combining five received SI messages to receive the five SI messages within an SI window having a window length of 10 ms.

In other embodiments, the broadcast information reception unit 220 may soft-combine the second system information repeatedly received across multiple windows for transmitting the second system information. In other words, the broadcast information reception unit 220 may soft-combine the SIBx repeatedly transmitted in accordance with the scheduling information across multiple SI windows. For example, the present embodiment may be preferred in cases where the SI messages cannot be successfully arranged with the above-stated intra-window soft-combining, for example, the case where the communication state is not good or the case where the user equipment 200 receives the limited bandwidth broadcast information. In other words, the SI message can be arranged with a larger number of SI messages by soft-combining the repeatedly received SI messages across multiple windows.

Figure 8:
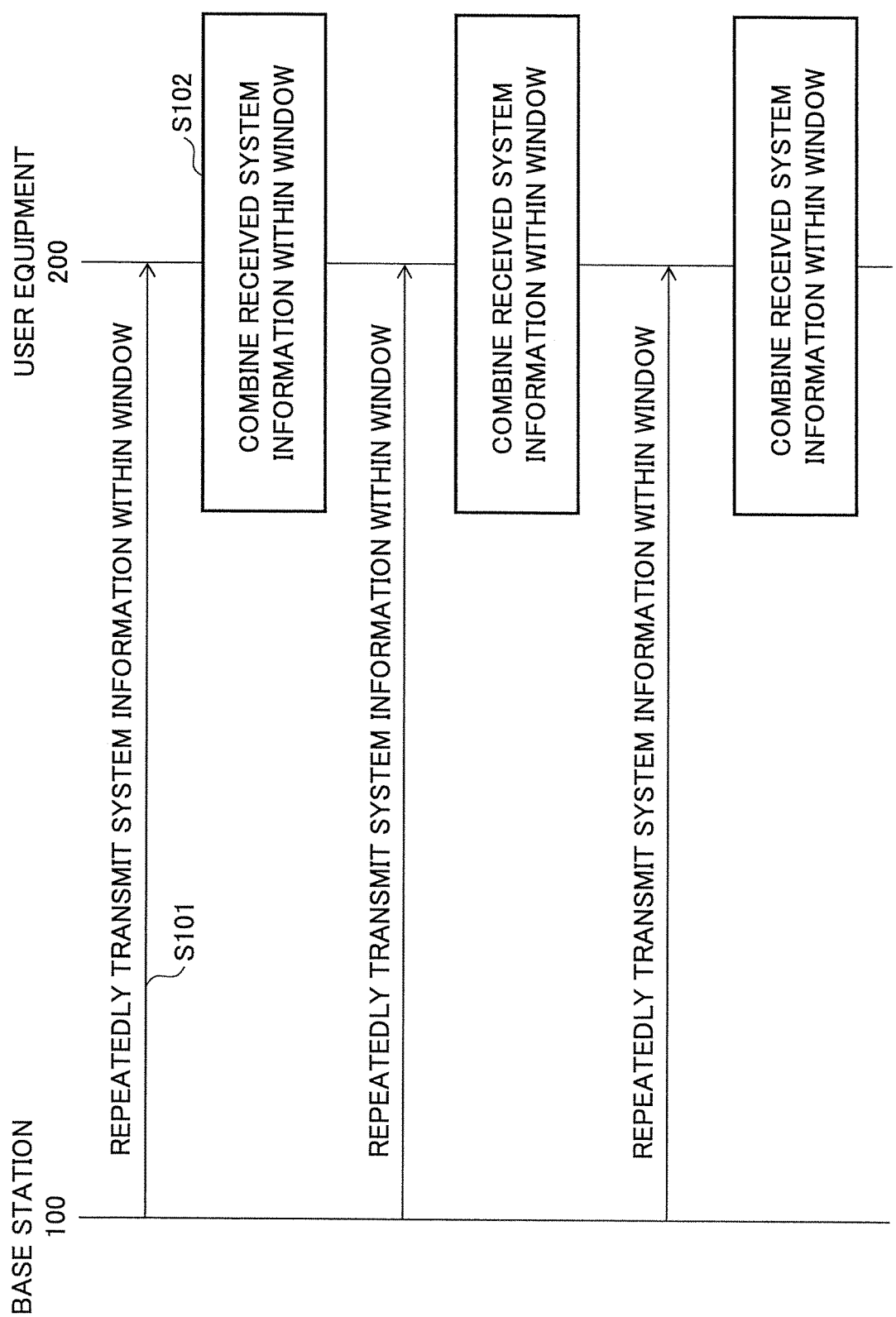
FIG. 8 is a sequence diagram for illustrating a broadcast information transmission and reception operation according to one embodiment of the present invention.

Next, broadcast information transmission and reception operations according to one embodiment of the present invention are described with reference to FIG. 8. FIG. 8 is a sequence diagram for illustrating the broadcast information transmission and reception operations according to one embodiment of the present invention.

As illustrated in FIG. 8, at step S101, the base station 100 broadcasts the first system information and the second system information. Here, the first system information includes scheduling information for the second system information. Specifically, the base station 100 repeatedly transmits SIBx mapped SI messages within SI windows. For example, the base station 100 repeatedly transmits the MIB including the scheduling information indicative of transmission opportunities of the SIB1 and the SIB1 including the scheduling information indicative of transmission opportunities of the subsequent SIBx (SIB2, SIB3, . . . ) at a predetermined cycle such as 40 ms. Here, the SIBx (SIB2, SIB3, . . . ) other than the SIB1 are stored and transmitted in the SI messages in accordance with mapping indicated in the scheduling information for the SIB1.

Also, the scheduling information for the SIB1 may identify subframes for repeatedly transmitting the subsequent SIBx. For example, the scheduling information may include window lengths of SI windows for transmitting the respective SI messages, repetition cycles of the SI messages repeatedly transmitted within the SI windows and transmission start timings (subframes) of the SI messages within the SI windows. According to LTE standard, the scheduling information is indicated to the user equipment 200 with a signaling data structure as illustrated in FIG. 4, and the base station 100 broadcasts the respective SIBx mapped SI messages in accordance with the indicated scheduling information.

At step S102, the user equipment 200 receives the first system information and the second system information, and the second system information is received in accordance with the scheduling information included in the first system information. Specifically, the user equipment 200 receives the subsequent SIBx (SIB2, SIB3, . . . ) in accordance with the scheduling information for the SIB1 and arranges the SI message by soft-combining the repeatedly received SI messages within the SI window. For example, it is assumed that the scheduling information (SchedulingInfo) for the SIB1 includes a window length (si-WindowLength) of a SI window of each SI message, a repetition cycle (si-RepetitionInterval) of the SI message and a transmission start timing (si-RepetitionOffset) of the SI message. Then, in each SI window, the user equipment 200 may receive the SI messages in subframes X to satisfy $$\text{si-RepetitionOffset}=X \bmod(\text{si-RepetitionInterval}),$$

where $0 \leq X \leq \text{si-WindowLength}-1$ and arrange the SI message by soft-combining the SI messages received within the SI window. However, the present invention is not limited to the above, and for example, the user equipment 200 may soft-combine the SI messages repeatedly received across multiple SI windows.

As illustrated, the above-stated steps S101 and S102 may be repeated for each transmission cycle of the SI messages.

The above-stated embodiments have been focused on the LTE system and the LTE-Advanced system, but the present invention is not limited to them. For example, the present invention may be applied to a radio communication system using a CDMA (Code Division Multiple Access) 2000, an Ultra Mobile Broadband (UMB), an IEEE802.11 (Wi-Fi), an IEEE802.16 (WiMAX), an IEEE802.20, an Ultra-Wideband (UWB), a Bluetooth (registered trademark) and/or any other appropriate system. Also, the above-stated information and signals may be represented with various different techniques and any of the techniques. For example, data, instructions, commands, information, signals, bits, symbols and chips referred to throughout the above description may be represented with voltages, currents, electromagnetic waves, magnetic fields or magnetic particles, optical fields or photons or any combination thereof. Also, software or instructions can be also transmitted via a transferring medium. For example, if the software is transmitted from a website, a server or other remote sources by using a coaxial cable, an optical fiber cable, a twist pair, a digital subscriber line (DSL) or wireless techniques such as infrared light, radio waves and microwaves, the coaxial cable, the optical fiber cable, the twist pair, the digital subscriber line (DSL) or the wireless techniques such as infrared light, radio waves and microwaves may be included within the scope of the transferring medium.

Although the embodiments of the present invention have been described in detail, the present invention is not limited to the above-stated specific embodiments, and various modifications and variations can be made within the spirit of the present invention as recited in claims.

LIST OF REFERENCE SYMBOLS

10: radio communication system
100: base station
110: communication control unit
120: broadcast information transmission unit
200: user equipment
210: transmission and reception unit
220: broadcast information reception unit

The invention claimed is:

1. A base station, comprising:
a processor that controls radio communication with a user equipment; and
a communication circuit that transmits broadcast information at a predetermined repetition cycle, the broadcast information including a Master Information Block (MIB),
wherein:
the user equipment is a low cost user equipment and receives system information,
the communication circuit broadcasts scheduling information for other System Information Blocks (SIBs) in System Information Block 1 (SIB 1) and broadcasts the other SIB s in accordance with the scheduling information,
the scheduling information for the other SIB s comprises: a field that indicates a window length, a repetition cycle that indicates a number of repeating subframes, and a transmission start timing for transmission of each of the other SIBs, and
the scheduling information identifies subframes for repeatedly transmitting the other SIBs using a condition identified based on the repetition cycle.

2. A user equipment, comprising:
a processor coupled to a memory; and
a communication circuit that:
transmits and receives radio signals to and from a base station; and
receives broadcast information from the base station at a predetermined repetition cycle, the broadcast information including a Master Information Block (MIB),
wherein:
the user equipment is a low cost user equipment and receives system information, the communication circuit receives other System Information Blocks (SIBs) in
accordance with scheduling information for the other SIBs included in System Information Block 1 (SIB 1) received from the base station,
the scheduling information for the other SIB s comprises: a field that indicates a window length, a repetition cycle that indicates a number of repeating subframes, and a transmission start timing for transmission of each of the other SIBs, and
the scheduling information identifies subframes for repeatedly transmitting the other SIBs using a condition identified based on the repetition cycle.

3. The user equipment as claimed in claim 2, wherein the communication circuit, coupled to the processor, decodes the other SIBs repeatedly received within a window to receive the other SIBs.

4. A broadcast information transmission and reception method, comprising:
broadcasting, by a base station, a Master Information Block (MIB), a System Information Block 1 (SIB 1) and other System Information Blocks (SIBs),
wherein the SIB 1 includes scheduling information for the other SIBs, and
wherein the base station broadcasts at a predetermined repetition cycle, the broadcast information including a Master Information Block (MIB); and
receiving, by user equipment, the SIB 1 and the other SIBs,
wherein:
the user equipment is a low cost user equipment and receives system information,
the other SIB s are received in accordance with the scheduling information in the SIB 1,
the scheduling information for the other SIB s comprises: a field that indicates a window length, a repetition cycle that
indicates a number of repeating subframes, and a transmission start timing for transmission of each of the other SIBs, and
the scheduling information identifies subframes for repeatedly transmitting the other SIBs using a condition identified based on the repetition cycle.

* * * * *